United States Patent
Norris et al.

(10) Patent No.: US 7,938,171 B2
(45) Date of Patent: May 10, 2011

(54) VAPOR COOLED HEAT EXCHANGER

(75) Inventors: James W. Norris, Labanon, CT (US);
Craig A. Nordeen, Manchester, CT (US)

(73) Assignee: United Technologies Corporation, Hartford, CT (US)

(*) Notice: Subject to any disclaimer, the term of this patent is extended or adjusted under 35 U.S.C. 154(b) by 1091 days.

(21) Appl. No.: 11/641,935

(22) Filed: Dec. 19, 2006

(65) Prior Publication Data
US 2008/0142189 A1    Jun. 19, 2008

(51) Int. Cl.
| F28D 15/00 | (2006.01) |
| F23L 15/02 | (2006.01) |
| F02M 31/08 | (2006.01) |
| F24H 9/02 | (2006.01) |
| F24H 3/00 | (2006.01) |

(52) U.S. Cl. ......... 165/104.21; 165/104.14; 165/104.16; 165/104.22; 165/104.26; 165/104.34; 165/9.3; 165/52; 165/129; 165/130

(58) Field of Classification Search ............ 165/11.1, 165/164, 104.19, 104.21, 104.22, 104.26, 165/104.34, 104.14, 104.27, 9.3, 52, 128–131
See application file for complete search history.

(56) References Cited

U.S. PATENT DOCUMENTS

| 3,334,685 | A | 8/1967 | Burggraf et al. |
| 3,844,679 | A | 10/1974 | Grondahl et al. |
| 4,886,111 | A * | 12/1989 | Nakai et al. ..................... 165/70 |
| 5,857,836 | A | 1/1999 | Stickler et al. |
| 5,954,478 | A | 9/1999 | Stickler et al. |
| 6,931,834 | B2 | 8/2005 | Jones |
| 6,990,797 | B2 | 1/2006 | Venkataramani et al. |
| 2005/0189097 | A1* | 9/2005 | Fowser et al. ................. 165/166 |
| 2007/0022732 | A1 | 2/2007 | Holloway et al. |

FOREIGN PATENT DOCUMENTS

WO    WO 2005/073539 A1    8/2005

OTHER PUBLICATIONS

S. Narayanan K.R., "What is a Heat Pipe?", http://www.cheresources.com (visited Oct. 2, 2006).

* cited by examiner

*Primary Examiner* — Judy J Swann
*Assistant Examiner* — Travis Ruby
(74) *Attorney, Agent, or Firm* — Kinney & Lange, P.A.

(57) ABSTRACT

A heat exchanger system includes a first fluid layer defining a first flowpath for a gas, a second fluid layer defining a second flowpath for a liquid, a first vapor cycle layer located between the first fluid layer and the second fluid layer for enabling heat transfer between the first and second fluid layers, a first boundary wall defining a shared boundary between the first fluid layer and the first vapor cycle layer, and a second boundary wall defining a shared boundary between the second fluid layer and the first vapor cycle layer. The first vapor cycle layer includes a working medium configured to transfer heat through an evaporation and condensation cycle, and the working medium of the first vapor cycle layer is sealed between the first and second boundary walls.

14 Claims, 1 Drawing Sheet

VAPOR COOLED HEAT EXCHANGER

BACKGROUND OF THE INVENTION

The present invention relates to a heat exchanger that utilizes vapor cooling to transmit thermal energy between two fluids.

In gas turbine engines, there is a need to reject heat from the engine during operation. Typically, that need has been addressed by transferring heat energy from a gas (e.g., hot air) to a liquid (e.g., engine fuel) through heat exchangers. Fuel acts as the principal heat sink on gas turbine engines for aircraft. However, there are limits on how much heat can be transferred to fuel before that fuel degenerates, and at about 218-232° C. (425-450° F.) at typical pressure conditions the fuel can instantaneously ignite (or auto-ignite). In order to prevent dangerous conditions associated with undesired auto-ignition of the fuel, known heat exchangers have been configured to provide buffer cavities.

FIG. 1 is a schematic view of a prior art heat exchanger 10 having a number of parallel buffer layers 12, hot air layers 14, and fuel layers 16. The layers are not shown to scale in FIG. 1. The heat exchanger 10 is configured such that the fuel layers 16 and the hot air layers 14 alternate, and a buffer layer 12 is located between adjacent fuel layers 16 and hot air layers 14. The hot air layers 14 and the fuel layers 16 are each passageways that allow hot air and fuel to flow through them, respectively. The buffer layers 12 are evacuated or partially evacuated voids that separate the fuel layers 16 and the hot air layers 14 to contain any leaks in the skins of those layers, which helps minimize the risk of fuel ignition due to interaction with the hot air. A series of pins (or fins) 18 extend across the buffer layers 12 between adjacent hot air layers 14 and fuel layers 16. The pins 18 provide structural support between layers of the heat exchanger 10, and also define paths for conductive heat transfer between adjacent hot air layers 14 and fuel layers 16 across the buffer layers 12. Substantially all of the heat transfer between different layers of the heat exchanger 10 occurs via conduction through the pins 18.

Known heat exchangers with buffer layers (see, e.g., FIG. 1) are relatively large and heavy, and heat transfer across the buffer layers is inefficient. In addition, because temperatures are not quickly and efficiently equalized across buffer layers, thermally-induced stresses can lead to undesirable heat exchanger lifespan reductions of known heat exchangers. Thus, it is desired to provide a relatively small and lightweight heat exchanger that can efficiently and reliably transfer heat between two fluids.

BRIEF SUMMARY OF THE INVENTION

A heat exchanger system includes a first fluid layer defining a first flowpath for a gas, a second fluid layer defining a second flowpath for a liquid, a first vapor cycle layer located between the first fluid layer and the second fluid layer for enabling heat transfer between the first and second fluid layers, a first boundary wall defining a shared boundary between the first fluid layer and the first vapor cycle layer, and a second boundary wall defining a shared boundary between the second fluid layer and the first vapor cycle layer. The first vapor cycle layer includes a working medium configured to transfer heat through an evaporation and condensation cycle, and the working medium of the first vapor cycle layer is sealed between the first and second boundary walls.

DETAILED DESCRIPTION

In general, the present invention relates to a heat exchanger that utilizes vapor cooling to transfer heat between a first fluid (e.g., hot air) and a second fluid (e.g., liquid jet fuel). As used herein, the term "vapor cooling" refers to the use of an evaporative cooling cycle to transfer thermal energy across a distance through the evaporation and condensation of a working medium. A heat exchanger according to the present invention utilizes a vapor cooled layer located between a layer through which the first fluid can flow and a layer through which the second fluid can flow. Use of the vapor cooled layer eliminates the need to have a buffer layer between the layers for the first and second fluids; and enables the heat exchanger to be relatively small and lightweight. Moreover, the evaporative cooling cycle of the vapor cooled layer can transfer heat quickly and efficiently, and the fast, consistent rate at which the vapor cooled layer can equalize temperature differentials helps to reduce thermal stresses on the heat exchanger. Thus, the heat exchanger of the present invention is readily adapted for use with gas turbine engines, where it is desired to transfer heat from hot air to a fuel while minimizing risks of undesired auto-ignition of the fuel. Further details of the present invention are explained below.

Figure 2:
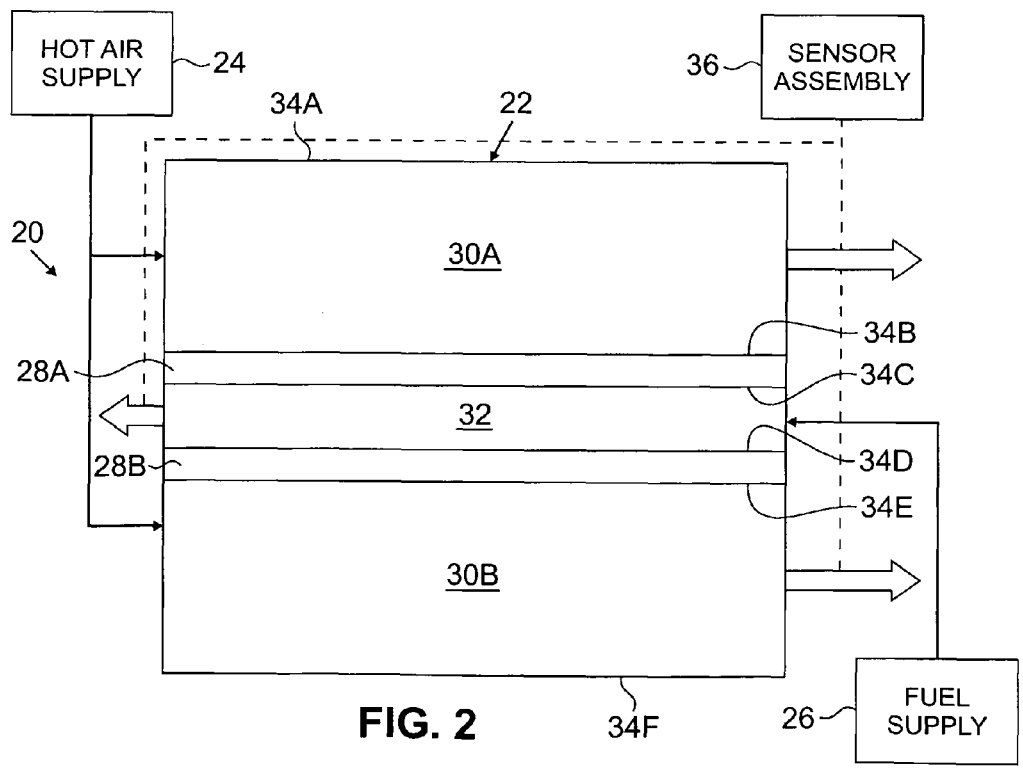
FIG. 2 is a schematic view of a vapor cooled heat exchanger system according to the present invention.

FIG. 2 is a schematic view of a vapor cooled heat exchanger system 20 that includes a heat exchanger assembly 22, a hot air supply 24 and a fuel supply 26. The heat exchanger assembly 22 includes vapor cooled layers 28A and 28B, first fluid layers 30A and 30B, and a second fluid layer 32. Skins 34A-34F define boundary walls of each layer of the heat exchanger assembly 22.

In the illustrated embodiment, the layers 28A, 28B, 30A, 30B and 32 of the heat exchanger assembly 22 are each generally planar and arranged parallel to one another. In further embodiments, the layers 28A, 28B, 30A, 30B, and 32 can have nearly any shape or configuration as desired. The first fluid layer 30A defines a flowpath for a first fluid between the skins 34A and 34B, and the first fluid layer 30B defines another flowpath for the first fluid between the skins 34E and 34F. The second fluid layer 32 defines a flowpath for a second fluid between the skins 34C and 34D. The vapor cooled layer 28A is defined between the skins 34B and 34C, and the vapor cooled layer 28B is defined between the skins 34D and 34E. The vapor cooled layer 28A is located between the first fluid layer 30A and the second fluid layer 32, and the vapor cooled layer 28B is located between the second fluid layer 32 and the first fluid layer 30B. The skins 34B-34E form shared boundary walls between adjacent layers: the skin 34B forms a shared boundary wall between the first fluid layer 30A and the vapor cooled layer 28A; the skin 34C forms a shared boundary wall between the vapor cooled layer 28A and the second fluid layer 32; the skin 34D forms a shared boundary wall between the second fluid layer 32 and the vapor cooled layer 28B; and the skin 34E forms a shared boundary wall between the vapor cooled layer 28B and the first fluid layer 30B.

Figure 1:
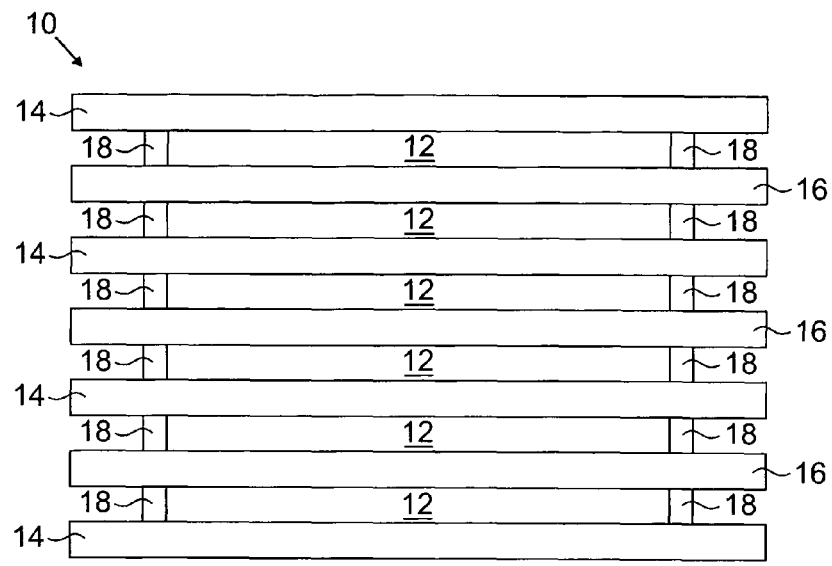
FIG. 1 is a schematic view of a prior art heat exchanger having buffer layers.

The skins 34A-34F can be made of a metallic material, such as nickel or titanium. It is generally desirable to have a relatively large surface area at the shared boundary walls formed by the skins 34B-34E, in order to increase the area where heat transfer can occur. Where the layers are planar as shown in FIG. 1, the shared boundary walls naturally have a relatively large surface area.

In the illustrated embodiment, the first fluid is a gas, and the first fluid layers 30A and 30B are each connected to the hot air supply 24 by suitable means (e.g., tubes, pipes, etc.). The hot air supply 24 delivers hot air from a gas turbine engine that is desired to be cooled. The hot air supply 24 can deliver hot air at the same temperature and pressure conditions to both of the first fluid layers 30A and 30B, or at different conditions. The hot air (i.e., the first fluid) passes through the length of the first fluid layers 30A and 30B and is then routed to a desired location after leaving the heat exchanger assembly 22. In alternative embodiments, the first fluid can be something other than hot air.

The second fluid in the illustrated embodiment is a fuel (e.g., conventional jet fuel), and the second fluid layer 32 is connected to the fuel supply 26 by suitable means(e.g., tubes, pipes, etc.). The fuel supply 26 delivers relatively cool fuel to the heat exchanger assembly 22. The fuel (i.e., the second fluid) passes through the length of the second fluid layer 32 and is then routed to a desired location after leaving the heat exchanger assembly 22. In alternative embodiments, the second fluid can be something other than fuel.

The vapor cooled layers 28A and 28B are each sealed, and each contain a working medium. The vapor cooled layers 28A and 28B each function as heat pipes that use an evaporative cooling cycle to transfer thermal energy through the evaporation and condensation of a working medium. In particular, the vapor cooled layer 28A utilizes an evaporative cooling cycle to transfer heat from the hot air (i.e., the first fluid) passing through the first fluid layer 30A to the fuel (i.e., the second fluid) passing through the second fluid layer 32. The vapor cooled layer 28B also utilizes an evaporative cooling cycle to transfer heat from the hot air (i.e., the first fluid) passing through the first fluid layer 30B to the fuel (i.e., the second fluid) passing through the second fluid layer 32. Thermal energy absorbed from the hot air causes the working medium of a vapor cooled layer 28A or 28B to evaporate, and the transfer of thermal energy to the fuel causes the working medium to condense. The working medium moves within the vapor cooled layer 28A or 28B to transfer the thermal energy between the regions of the layers 28A and 28B where evaporation and condensation occur.

The internal configuration of the vapor cooled layers can be any of any conventional configuration. However, for applications where the heat transfer assembly 22 will not have a well-defined orientation, such as where the assembly 22 is used with a gas turbine engine of an aircraft that changes orientation as it flies, it is desirable to utilize conventional capillary action structures (e.g., wick structures) or a capillary action foam inside the vapor cooled layers 28A and 28B. The use of a capillary action in a well-known manner facilitates desired movement of the condensed working medium along an established path without requiring the aid of gravity or a well-defined orientation of the heat exchanger assembly 22.

The composition of the working medium used in each of the vapor cooled layers 28A and 28B is selected according to the particular operating conditions at which heat transfer is desired. Typically, working media conventionally used with evaporative cooling cycles are dependent upon operation within a particular range of temperature conditions (as well as pressure conditions). It is therefore necessary to select a suitable working medium based on the particular conditions under which each of the vapor cooled layers 28A and 28B of the heat transfer assembly 22 is expected to operate, as will be understood by those skilled in the art. A non-exclusive list of possible working media is provided in Table 1, although those skilled in the art will recognize that other working medium materials can be used.

TABLE 1

| Working Medium | Melting Point (° C.) | Boiling Point (° C. at 101.3 kPa) | Approximate Useful Range (° C.) |
| --- | --- | --- | --- |
| Helium | −271 | −261 | −271 to −269 |
| Nitrogen | −210 | −196 | −203 to −160 |
| Ammonia | −78 | −33 | −60 to 100 |
| Acetone | −95 | 57 | 0 to 120 |
| Methanol | −98 | 64 | 10 to 130 |
| Flutec PP2 ™ | −50 | 76 | 10 to 160 |
| Ethanol | −112 | 78 | 0 to 130 |
| Water | 0 | 100 | 30 to 200 |
| Toluene | −95 | 110 | 50 to 200 |
| Mercury | −39 | 361 | 250 to 650 |
| Sodium | 98 | 892 | 600 to 1200 |
| Lithium | 179 | 1340 | 1000 to 1800 |
| Silver | 960 | 2212 | 1800 to 2300 |

Both of the vapor cooled layers 28A and 28B can utilize the same working medium, or different working media. In other words, it is possible to match the working medium at a particular location to the anticipated operating conditions at that location. In further embodiments, the heat exchanger assembly 22 can be configured such that different working media are provided that each operate within discrete ranges of an overall anticipated range of operating condition temperatures.

It should be noted that thermal energy is conducted across the shared boundary walls formed by the skins 34B-34E in order to pass to or from the vapor cooled layers 28A and 28B. The skins 34B-34E are generally configured to be as thin as possible while still providing suitable structural integrity to the heat exchanger assembly 22. Most metallic materials of the skins 34B-34E will provide more than adequate heat conduction to and from the vapor cooled layers 28A and 28B. Optimal skin materials will vary according to the specific conditions associated with particular applications.

A sensor assembly 36 is operably connected to the heat exchanger assembly 22. By using the sensor assembly 36 to measure temperature and fluid flow out of the first and second fluid layers 30A, 30B, and 32 of the heat exchanger assembly 22 in a conventional manner, a determination of heat exchanger efficiency can be made. Analysis of heat exchanger efficiency over time permits detection of performance losses, which can be used to detect leaks or other failures in the assembly 22. Real-time monitoring using the sensor assembly 36 enables operators or controllers to shut down all or part of the heat exchanger assembly 22 upon detection of leaks or other failures in order to avoid fire or other catastrophic failures.

A conventional buffer layer is not required between the first fluid layers 30A and 30B and the second fluid layer 32 of the heat exchanger assembly 22. The hot air in the first fluid layers 30A and 30B is isolated from the fuel in the second fluid layer 32 by the vapor cooled layers 28A and 28B. Also, the vapor cooled layers 28A and 28B typically have internal pressures below atmospheric pressure (101.3 kPa), while the first fluid layers 30A and 30B and the second fluid layer 32 each typically have internal pressure of approximately 10,342 kPa (1,500 psi). In the event that a leak occurs through one of the skins 34A-34F, and particularly through one of the shared boundary walls formed by the skins 34B-34E, the leaked fluid will tend to flow into the adjacent vapor cooled layer 28A and 28B which is at a lower pressure. The sensor assembly 36 enables detection of such a leak, and appropriate shutdown procedures can generally be performed before fluid can leak through both shared boundary walls of any of the vapor cooled layers 28A and 28B. The working media in the vapor cooled layers 28A and 28B can have a composition selected such that no harmful reactions occur when brought into contact with either the first fluid (e.g., hot air) or the second fluid (e.g., fuel).

Because the vapor cooled layers of the heat exchanger assembly of the present invention make discrete buffer layers unnecessary, the overall size of the assembly can be about half the size of known heat exchangers with buffer layers. The relatively small size of the assembly also makes it relatively lightweight. Vapor cooled layers of the heat exchange assembly of the present invention also can transfer thermal energy at a rate up to about 1000 times faster than known heat exchangers that conduct thermal energy through pins or fins. Heat transfer across vapor cooled layers also can occur at well-defined and consistent rates.

Although the present invention has been described with reference to preferred embodiments, workers skilled in the art will recognize that changes may be made in form and detail without departing from the spirit and scope of the invention. For example, the shape and size of the layers, the number and arrangement of the layers, and the types of fluids and working media for the heat exchanger of the present invention can vary as desired for particular applications.

What is claimed is:

1. A heat exchanger system comprising:
a first fluid layer defining a first flowpath for a gas;
a second fluid layer defining a second flowpath for a liquid;
a first vapor cycle layer located between the first fluid layer and the second fluid layer for enabling heat transfer between the first and second fluid layers, wherein the first vapor cycle layer comprises a first working medium configured to transfer heat through an evaporation and condensation cycle;
a first boundary wall defining a shared boundary between the first fluid layer and the first vapor cycle layer;
a second boundary wall defining a shared boundary between the second fluid layer and the first vapor cycle layer, wherein the first working medium of the first vapor cycle layer is sealed off between the first and second boundary walls; and
a second vapor cycle layer located adjacent to the second fluid layer and opposite the first vapor cycle layer, wherein a second working medium of the second vapor cycle layer comprises a material with an evaporation and condensation cycle that operates under different temperature and pressure conditions than the first working medium of the first vapor cycle layer, and wherein the first working medium and the second working medium comprise different materials.

2. The system of claim 1, wherein the first vapor cycle layer is at a lower pressure than both the first fluid layer and the second fluid layer.

3. The system of claim 1, wherein the liquid of the second fluid layer comprises a fuel.

4. The system of claim 3 and further comprising:
a fuel supply for delivering the fuel to the second fluid layer.

5. The system of claim 1, wherein no buffer layer cavity is disposed adjacent to the first vapor cycle layer.

6. The system of claim 1 and further comprising:
a sensor assembly for monitoring efficiency of the heat exchanger system.

7. A heat exchanger apparatus comprising:
a vapor cycle chamber for enabling heat transfer, wherein the vapor cycle chamber includes a first working medium sealed in the vapor cycle chamber to transfer heat between different portions of the vapor cycle chamber through an evaporation and condensation cycle; and
a first fluid passageway located directly adjacent to the vapor cycle chamber, wherein the first fluid passageway is configured to accept a gas;
a second fluid passageway located directly adjacent to the vapor cycle chamber and opposite the first fluid passageway, wherein the second fluid passageway is configured to accept a liquid, and wherein heat transfer between the first fluid passageway and the second fluid passageway occurs across the vapor cycle chamber; and
an auxiliary vapor cycle chamber located adjacent to and in heat exchange relationship the second fluid passageway, wherein a second working medium of the auxiliary vapor cycle chamber comprises a material with an evaporation and condensation cycle that operates under different temperature and pressure conditions than the first working medium, and wherein the first working medium and the second working medium comprise different materials.

8. The apparatus of claim 7, wherein the first fluid passageway and the vapor cycle chamber share a common boundary wall.

9. The apparatus of claim 7, wherein the second fluid passageway and the vapor cycle chamber share a common boundary wall.

10. The apparatus of claim 7, wherein the vapor cycle chamber is at a lower pressure than both the first fluid passageway and the second fluid passageway.

11. The apparatus of claim 7 and further comprising:
a sensor subassembly for monitoring efficiency of the heat exchanger apparatus.

12. A heat exchanger apparatus comprising:
a first passageway for heated air to pass through;
a second passageway for fuel to pass through;
a first vapor cycle chamber located between the first and second passageways having a first working medium sealed in the first vapor cycle chamber for transferring thermal energy from the heated air to the fuel through an evaporation and condensation cycle, wherein the first vapor cycle chamber has a first shared boundary wall shared with the first passageway and a second shared boundary wall shared with the second passageway; and
a second vapor cycle chamber located adjacent to and in the heat exchange relationship the second passageway, wherein a second working medium of the second vapor cycle chamber comprises a material with an evaporation and condensation cycle that operates under different temperature and pressure conditions than the first working medium of the first vapor cycle chamber, and wherein the first working medium and the second working medium comprise different materials.

13. The apparatus of claim 12, wherein the first vapor cycle chamber is configured to operate at a lower pressure than both the first passageway and the second passageway.

14. The apparatus of claim 12 and further comprising:
a sensor assembly for monitoring efficiency of the heat exchanger apparatus.

* * * * *

UNITED STATES PATENT AND TRADEMARK OFFICE
CERTIFICATE OF CORRECTION

PATENT NO. : 7,938,171 B2  
APPLICATION NO. : 11/641935  
DATED : May 10, 2011  
INVENTOR(S) : James W. Norris and Craig A. Nordeen Page 1 of 1

It is certified that error appears in the above-identified patent and that said Letters Patent is hereby corrected as shown below:

Title Page, Item (75) Inventors:
 Delete "Labanon"
 Insert --Lebanon--

Col. 6, Line 17, Claim 7
 Insert --with-- after "relationship"

Col. 6, Line 48, Claim 12
 Delete "the"

Col. 6, Line 49, Claim 12
 Insert --with-- after "relationship"

Signed and Sealed this
Seventeenth Day of April, 2012

David J. Kappos
*Director of the United States Patent and Trademark Office*